US010495172B2

(12) United States Patent
Thurston et al.

(10) Patent No.: US 10,495,172 B2
(45) Date of Patent: Dec. 3, 2019

(54) EQUIPMENT PLATFORM

(71) Applicant: ASSET GUARD PRODUCTS INC., Houston, TX (US)

(72) Inventors: Richard Parker Thurston, Argyle, TX (US); Jeremy Carter, Roanoke, TX (US)

(73) Assignee: ASSET GUARD PRODUCTS INC., Houston, TX (US)

( * ) Notice: Subject to any disclaimer, the term of this patent is extended or adjusted under 35 U.S.C. 154(b) by 0 days.

(21) Appl. No.: 15/614,720

(22) Filed: Jun. 6, 2017

(65) Prior Publication Data

US 2018/0346192 A1    Dec. 6, 2018

(51) Int. Cl.
*B65D 19/00* (2006.01)
*F16F 1/36* (2006.01)
(Continued)

(52) U.S. Cl.
CPC ........ *F16F 1/3615* (2013.01); *B65D 19/0002* (2013.01); *B65D 85/68* (2013.01); *B65D 90/12* (2013.01); *E02D 27/00* (2013.01); *B65D 2519/00019* (2013.01); *B65D 2519/00024* (2013.01); *B65D 2519/00029* (2013.01); *B65D 2519/00034* (2013.01); *B65D 2519/00054* (2013.01); *B65D 2519/00059* (2013.01); *B65D 2519/00064* (2013.01); *B65D 2519/00069* (2013.01); *B65D 2519/00268* (2013.01); *B65D 2519/00273* (2013.01);
(Continued)

(58) Field of Classification Search
CPC ....................... B65D 19/0055; B65D 19/0069; B65D 90/40; F16F 1/3615

USPC ............................ 248/346.01, 346.02, 346.03
See application file for complete search history.

(56) References Cited

U.S. PATENT DOCUMENTS

| 3,713,620 A | 1/1973 | Tkach |
| 4,078,348 A | 3/1978 | Rothman |

(Continued)

FOREIGN PATENT DOCUMENTS

| EP | 1514885 A1 | 3/2005 |
| WO | 2007136514 A1 | 11/2007 |
| WO | 2008003120 A1 | 1/2008 |

OTHER PUBLICATIONS

Versaflex Polyurea Sealants and Coatings:: The Polyurea People; http://www.versaflex.com.
(Continued)

*Primary Examiner* — Todd M Epps
(74) *Attorney, Agent, or Firm* — Patterson + Sheridan, LLP

(57) ABSTRACT

Improved equipment bases and methods for making and using same are disclosed herein. The equipment base can include a first coated substrate including a first part having a first thickness sized to provide the load-bearing support for the equipment, a first elastomer coating the first part, a second coated substrate positioned adjacent to the first coated substrate, the second coated substrate including a second part having a second thickness sized to provide the load-bearing support for the equipment, and a second elastomer coating the second part. A first seam can be formed between the first and second coated substrates to allow for moisture to pass between the first and second coated substrates so that moisture is allowed to seep away from the bottom of the equipment.

19 Claims, 6 Drawing Sheets

(51) Int. Cl.
  *B65D 85/68* (2006.01)
  *B65D 90/12* (2006.01)
  *E02D 27/00* (2006.01)

(52) U.S. Cl.
  CPC .............. *B65D 2519/00278* (2013.01); *B65D 2519/00288* (2013.01); *B65D 2519/00293* (2013.01); *B65D 2519/00318* (2013.01); *B65D 2519/00323* (2013.01); *B65D 2519/00343* (2013.01); *B65D 2519/00567* (2013.01); *B65D 2519/00756* (2013.01); *B65D 2519/00815* (2013.01); *B65D 2585/6877* (2013.01)

(56) References Cited

U.S. PATENT DOCUMENTS

| | | | |
|---|---|---|---|
| 4,355,844 | A | 10/1982 | Fantini Muzzarelli |
| 4,765,775 | A | 8/1988 | Kroger |
| 4,802,322 | A | 2/1989 | Bendfeld |
| 4,844,287 | A | 7/1989 | Long |
| 4,865,899 | A | 9/1989 | Reichert |
| 4,917,537 | A | 4/1990 | Jacobson |
| 5,105,746 | A | 4/1992 | Reynolds |
| 5,143,768 | A | 9/1992 | Wilderman et al. |
| 5,281,055 | A | 1/1994 | Neitzke |
| 5,317,076 | A | 5/1994 | Primeaux |
| 5,401,456 | A | 3/1995 | Alesi et al. |
| 5,447,389 | A | 9/1995 | Olson |
| 5,454,195 | A | 10/1995 | Hallsten |
| 5,549,418 | A | 8/1996 | Devine et al. |
| 5,679,432 | A | 10/1997 | Holmquest et al. |
| 5,814,693 | A | 9/1998 | Priest et al. |
| 5,882,142 | A | 3/1999 | Siglin et al. |
| 5,895,025 | A | 4/1999 | Alesi et al. |
| 6,026,760 | A | 2/2000 | Phillips et al. |
| 6,050,539 | A | 4/2000 | Millen |
| 6,315,495 | B1 | 11/2001 | Starheim |
| 6,327,722 | B1 | 12/2001 | Noble |
| 6,359,384 | B1 | 3/2002 | Nakaya et al. |
| 6,418,861 | B1 | 7/2002 | Flam |
| 6,695,534 | B2 | 2/2004 | Cain et al. |
| 6,841,111 | B2 | 1/2005 | Rickner et al. |
| 6,854,926 | B2 | 2/2005 | Siglin et al. |
| 7,114,210 | B2 | 10/2006 | Heinz |
| 7,494,298 | B2 | 2/2009 | Perkins |
| 7,946,439 | B1 | 5/2011 | Toscano et al. |
| 8,734,052 | B2 * | 5/2014 | Perkins .................. B65D 90/24 220/890 |
| 8,761,052 | B2 | 6/2014 | Wang et al. |
| 9,410,302 | B2 * | 8/2016 | Perkins .................. B65D 90/24 |
| 9,562,585 | B2 | 2/2017 | Almazan Campillay et al. |
| 2002/0137871 | A1 | 9/2002 | Wheeler et al. |
| 2005/0029425 | A1 | 2/2005 | Garton |
| 2005/0058838 | A1 | 3/2005 | Markusch et al. |
| 2005/0158131 | A1 | 7/2005 | Markusch et al. |
| 2006/0027794 | A1 | 2/2006 | Heinz |
| 2006/0057394 | A1 | 3/2006 | Cork |
| 2006/0122320 | A1 | 6/2006 | Cahill et al. |
| 2007/0208156 | A1 | 9/2007 | Posey et al. |
| 2007/0208157 | A1 | 9/2007 | Posey et al. |
| 2008/0003060 | A1 | 1/2008 | Perkins |
| 2008/0047210 | A1 | 2/2008 | Bell |
| 2008/0092730 | A1 | 4/2008 | Hall |
| 2009/0151791 | A1 | 6/2009 | Perkins |
| 2009/0324335 | A1 | 12/2009 | Fossen et al. |
| 2009/0324336 | A1 | 12/2009 | Fossen et al. |
| 2010/0098371 | A1 | 4/2010 | Perkins et al. |
| 2010/0140262 | A1 | 6/2010 | Whitener |
| 2016/0340854 | A1 | 11/2016 | Perkins et al. |

OTHER PUBLICATIONS

Sherwin-Williams, http://www.sherwin-williams.com/pro/index.jsp.
Sherwin-Williams Envirolastic AR200 HD White.
The Sherwin-Williams Company Material Safety Date Sheet, B81V3300, Mar. 17, 2009.
Office Action dated Jun. 27, 2008, by the USPTO, regarding U.S. Appl. No. 11/426,996.
Notice of Allowance dated Oct. 22, 2008, by the USPTO, regarding U.S. Appl. No. 11/426,996.
Office Action dated Aug. 2, 2010, by the USPOT, regarding U.S. Appl. No. 12/391,106.
Dudley J. Primeaux II, "Polyurea Solves Temporary Issue," Polyurea Development Associate, 2004.
Specification of VFI-210 (210SC80) Secondary Containment Membrane on Geotextile Over Earthen Surfaces, Update Sep. 1999.
Geotextile Coatings, Primeaux Associates LLC.
Spraying over Geotextile, 2001, 2003, 2005 Primeaux Associates LLC, Rev. 03.05.
General Standard: Polyurea / Geotextile Elastomeric Lining Systems, Polyurea Development Association.
http://polyureasystems.com/apps.htm (2005)—Markets and Applications for Spray Polyurea.
Primeaux Associates (2001)—Spraying over Geotextile.
Primeaux and Hanson (Sep. 11, 2006)—The True Polyurea Spray Elastomer Story: Chemistry, Advances, and Applications.
http://www.coatingsworld.com/contents/view/21465 (Aug. 11, 2005)—S-W polyurea helps in fight against.
Office Action dated Dec. 20, 2011 in U.S. Appl. No. 12/501,307 (9 pages).
Non-Final Office Action datled Jun. 22, 2011, by the USPTO, in U.S. Appl. No. 12/365,781.
Final Office Action dated Oct. 17, 2011, by the USPTO, in U.S. Appl. No. 12/365,78t.
Advisory Action dated Dec. 28, 2011, by the USPTO, in U.S. Appl. No. 12/365,781.
Non-Final Office Action dated Jan. 28, 2014, by the USPTO, in U.S. Appl. No. 12/365,781.
Interview Summary dated Mar. 11, 2014, by the USPTO, in U.S. Appl. No. 12/365,781.
Notice of Allowance dated Apr. 11, 2014, by the USPTO, in U.S. Appl. No. 12/365,781.
*Falcon Technologies and Services, Inc. vs. Benchmark Foam Inc.,* Complaint for Patent Infringement, Case No. 4:14-cv-00489, filed Jul. 30, 2014.
*Falcon Technologies and Services, Inc. vs. All Seasons Foam Coatings & Services LLC,* Complaint for Patent Infringement, Case No. 4:15-cv-00916, filed Apr. 8, 2015.
Office Action dated Jan. 13, 2016 for U.S. Appl. No. 14/285,898.
Ashrefmohamed A. Alzawi; Vibration Isolation Usin In-filled Geofoam Trench Barriers, Western Graduate&Postdoctoral Studies, Sep. 2011 pp. 1-236.
Plaintiff Falcon Technologies and Services, Inc.'s Second Request for Production to Sentinel Manufacturing, Inc. (Nos. 19-23), Exhibit 2, *Asset Guard Products Inc., d.b.a. Falcon Technologies and Services, Inc.,* v. *Sentinel Manufacturing, Inc. (f/k/a/ Sentinal Containment, Inc.),* In the United States District Court for the Southern District of Texas, Houston Division, Civil Action No. 4:17-CV-00971, Apr. 17, 2019, 8 pp.
Order Denying Defendant Sentinel Manufacturing, Inc.'s Partial Motion for Judgment on the Pleadings, *Asset Guard Products Inc., d.b.a. Falcon Technologies and Services, Inc.* v. *Sentinel Manufacturing, Inc. (f/k/a Sentinal Containment, Inc.)* In the United States District Court for the Southern District of Texas, Houston Division, Civil Action No. 4:17-CV-00971, May 10, 2019, 2 pp.
Complaint for Patent Infringement, *Asset Guard Products Inc., d.b.a. Falcon Technologies and Services, Inc.,* v. *Sentinel Containment, Inc.,* In the United States District Court for the Southern District of Texas, Houston Division, Civi Action No. 4:17-CV-00971, Mar. 29, 2017, 7 pp.
Order for Conference and Disclosure of Interested Parties, *Asset Guard Products Inc.* v. *Sentinel Containment, Inc.,* United States District Court, Southern District of Texas, Civil Action No. 4:17-CV-00971, Mar. 31, 2017, 4 pp.
Plaintiff's Certificate of Interested Parties, *Asset Guard Products Inc., d.b.a. Falcon Technologies and Services, Inc.,* v. *Sentinel*

(56) References Cited

OTHER PUBLICATIONS

*Manufacturing Inc.*, In the United States District Court for Southern District of Texas, Houston Division, Civil Action No. 4:17-cv-00971, Apr. 18, 2017, 1 p.
Notice of Appearance for Defendant Sentinel Containment, Inc., *Asset Guard Products, Inc. v. Sentinel Containment, Inc.*, In the United States District Court for Southern District of Texas, Civil Action No. 4:17-cv-00971, May 10, 2017, 3 pp.
Ex Parte Reexamination Communication Transmittal Form, U.S. Appl. No. 90/014,303, dated May 20, 2019, 3 pp.
Reexamination file history, U.S. Appl. No. 90/014,303, dated May 20, 2019, 378 pp.
Defendant Sentinel Manufacturing, Inc.'s Partial Motion for Judgment on the Pleadings, *Asset Guard Products Inc., d.b.a. Falcon Technologies and Services, Inc., v. Sentinel Manufacturing, Inc. (f/k/a Sentinel Containment, Inc.)*, In the United States District Court for the Southern District of Texas, Houston Division, Civil Action No. 4:17-cv-00971, Apr. 19, 2019, 12 pp.
Notice of Appearance for Defendant *Sentinel Containment, Inc., Asset Guard Products Inc. v. Sentinel Containment, Inc* ., In the United States District Court for the Southern District of Texas, Civil Action No. 4:17-CV-00971, May 10, 2017, 3 pp.
Jury Demand, *Asset Guard Products Inc. d.b.a. Falcon Technologies and Services, Inc., v. Sentinel Containment, Inc.*, In the United States District Court for the Southern District of Texas, Houston Division, Civil Action No. 4:17-CV-00971, Jun. 30, 2017, 11 pp.
Joint Report of the Meeting and Joint Discovery/Case Management Plan Under Rule 26(F) of Federal Rules of Civil Procedure, *Asset Guard Products Inc., d.b.a. Falcon Technologies and Services, Inc., v. Sentinel Manufacturing, Inc., f/k/a Sentinal Containment, Inc.*, In the United States District Court for the Southern District of Texas, Houston Division, Civil Action No. 4:17-CV-00971, Jul. 20, 2017, 8 pp.
Plaintiff Asset Guard Products Inc.'s d.b.a. Falcon Technologies, Inc., Answer to Defendant's Answer, Counterclaims, & Defenses, *Asset Guard Products Inc., d.b.a. Falcon Technologies and Services, Inc., v. Sentinel Manufacturing Inc. (f/k/a/ Sentinal Containment, Inc.)*, In the United States District Court for the Southern District of Texas, Houston Division, Civil Action No. 4:17-CV-00971, dated Sep. 20, 2017, 5 pp.
Agreed Motion for Amended Scheduling Order, *Asset Guard Products Inc., d.b.a. Falcon Technologies and Services, Inc., v. Sentinel Manufacturing, Inc. (f/k/a/ Sentinal Containment, Inc.)* In the United States District Court for the Southern District of Texas, Houston Division, Civil Action No. 4:17-CV-00971, dated Oct. 9, 2017, 3 pp.
Patent Case—Scheduling Order, *Asset Guard Products Inc., d.b.a. Falcon Technologies and Services, Inc., v. Sentinel Manufacturing, Inc. (f/k/a/ Sentinal Containment, Inc.)* In the United States District Court for the Southern District of Texas, Houston Division, Civil Action No. 4:17-CV-00971, dated Oct. 16, 2017, 6 pp.
Notice of Change of Address, *Assest Guard Products Inc., d.b.a. Falcon Technologies and Services, Inc., v. Sentinel Manufacturing Inc.*, In the United States District Court for the Southern District of Texas, Houston Division, Civil Action Vo. 4:17-CV-00971, dated Nov. 29, 2017, 2 pp.
Plantiff Asset Guard Products Inc.'s and Defendant Sentinel Manufacturing, Inc.'s Joint Claim Construction and Prehearing Statement, *Asset Guard Products Inc., d.b.a. Falcon Technologies and Services, Inc., v. Sentinel Manufacturing, Inc. (f/k/a/ Sentinal Containment, Inc.)*, In the United States District Court for the Southern District of Texas, Houston Division, Civil Action No. 4:17-CV-00971, dated Jan. 31, 2018, 4 pp.
Defendant Sentinel Manufacturing, Inc.'s Written Tutorial Concerning Technology Involved in the '302 Patent, *Asset Guard Products Inc., d.b.a. Falcon Technologies and Services, Inc., v. Sentinel Containment, Inc.*, In the United States District Court for the Southern District of Texas, Houston Division, Civil Action No. 4:17-CV-00971, dated Feb. 28, 2018, 7 pp.
Defendant Sentinel Manufacturing, Inc.'s Notice of Nomination of Scott Woloson as a Court-Appointed Expert Witness, *Asset Guard Products Inc., d.b.a. Falcon Technologies and Services, Inc., v. Sentinel Containment, Inc.*, In the United States District Court for the Southern District of Texas, Houston Division, Civil Action No. 4:17-CV-00971, dated Feb. 21, 2018, 2 pp.
Plaintiff Asset Guard Products Inc's d.b.a. Falcon Technologies, Inc., Statement re Court Appointed Special Master or Expert, *Asset Guard Products Inc. d.b.a. Falcon Technologies and Services, Inc., v. Sentinel Manufacturing, Inc. (f/k/a Sentinel Containment, Inc.)*, In the United States District Court for the Southern District of Texas, Houston Division, Civil Action No. 4:17-CV-00971, dated Feb. 21, 2018, 2 pp.
Plantiff Asset Guard Products Inc.'s d.b.a. Falcon Technologies, Inc., Opening Claim Construction Brief, *Asset Guard Products Inc., d.b.a. Falcon Technologies and Services, Inc., v. Sentinel Manufacturing, Inc. (f/k/a Sentinal Containment, Inc.)*, In the United States District Court for the Southern District of Texas, Houston Division, Civil Action Vo. 4:17-CV-00971, Mar. 7, 2018, 24 pp.
Plaintiff Asset Guard Products Inc's d.b.a. Falcon Technologies, Inc., Reply Brief on Claim Construction, *Asset Guard Products Inc., d.b.a. Falcon Technologies and Services, Inc., v. Sentinel Manufacturing, Inc. (f/k/a Sentinal Containment, Inc.)*, In the United States District Court for the Southern District of Texas, Houston Division, Civil Action Vo. 4:17-CV-00971, Mar. 28, 2018, 18 pp.
Plantiff Asset Guard Products Inc.'s and Defendant Sentinel Manufacturing, Inc.'s Notice of Estimated Time Requested for Markman Hearing, *Assest Guard Products Inc., d.b.a. Falcon Technologies, Inc., v. Sentinel Manufacturing, Inc. (f/k/a Sentinal Containment, Inc.)*, In the United States District Court for the Southern District of Texas, Houston Division, Civil Action No. 4:17-CV-00971, Mar. 28, 2018, 2 pp.
Notice of Setting, *Asset Guard Products Inc. v. Sentinel Containment, Inc.*, In the United States District Court for the Southern District of Texas, Civil Action No. 4:17-CV-00971, Apr. 25, 2018, 1 p.
Agreed Motion for Amended Scheduling Order, *Asset Guard Products Inc., d.b.a. Falcon Technologies and Services, Inc., v. Sentinel Manufacturing, Inc.*, In the United States District Court for the Southern District of Texas, Houston Division, Civil Action No. 4:17-CV-00971, May 2, 2018, 3 pp.
Proposed Patent Case—Scheduling Order, *Asset Guard Products Inc., d.b.a. Falcon Technologies and Services, Inc., v. Sentinel Manufacturing, Inc. (f/k/a Sentinal Containment, Inc.)*, In the United States District Court for the Southern District of Texas, Houston Division, Civil Action No. 4:17-CV-00971, May 9, 2018, 7 pp.
Patent Case—Scheduling Order, *Asset Guard Products Inc., d.b.a. Falcon Technologies and Services, Inc., v. Sentinel Manufacturing, Inc. (f/k/a Sentinal Containment, Inc.)*, In the United States District Court for the Southern District of Texas, Houston Division, Civil Action No. 4:17-CV-00971, May 9, 2018, 7 pp.
Agreed Motion for Amended Scheduling Order, *Asset Guard Products Inc., d.b.a. Falcon Technologies and Services, Inc., v. Sentinel Manufacturing, Inc. (f/k/a Sentinal Containment, Inc.)*, In the United States District Court for the Southern District of Texas, Houston Division, Civil Action No. 4:17-CV-00971, Sep. 10, 2018, 3 pp.
Scheduling Order, *Asset Guard Products Inc., d.b.a. Falcon Technologies and Services, Inc., v. Sentinel Manufacturing, Inc. (f/k/a Sentinal Containment, Inc.)*, In the United States District Court for the Southern District of Texas, Houston Division, Civil Action No. 4:17-CV-00971, filed Sep. 10, 2018, 5 pp.
Defendant Sentinel Manufacturing, Inc.'s Unopposed Motion for Leave to File Supplemental Claim Construction Brief, *Asset Guard Products Inc., d.b.a. Falcon Technologies and Services, Inc., v. Sentinel Manufacturing, Inc. (f/k/a Sentinel Containment, Inc.)*, In the United States District Court for the Southern District of Texas, Houston Division, Civil Action No. 4:17-CV-00971, Sep. 26, 2018, 3 pp.
Defendant Sentinel Manufacturing, Inc.'s Supplemental Claim Construction Brief, *Asset Guard Products Inc., d.b.a. Falcon Technologies and Services, Inc., v. Sentinel Manufacturing, Inc. (f/k/a Sentinel Containment, Inc.)*, In the United States District Court for the Southern District of Texas, Houston Division, Civil Action No. 4:17-CV-00971, Sep. 26, 2018, 32 pp.

(56) References Cited

OTHER PUBLICATIONS

Notice of Appearance, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Oct. 2, 2018, 2 pp.
Plantiff Asset Guard Product Inc.'s d.b.a. Falcon Technologies, Inc., Supplemental Responsive Brief on Claim Construction, *Asset Guard Products Inc., d.b.a. Falcon Technologies and Services, Inc.*, v. *Sentinel Manufacturing, Inc. (f/k/a Sentinel Containment, Inc.)*, In the United States District Court for the Southern District of Texas, Houston Division, Civil Action No. 4:17-CV-00971, Oct. 8, 2018, 10 pp.
Plaintiff Asset Guard Products Inc.'s and Defendant Sentinel Manufacturing, Inc.'s Claim Construction Chart, *Asset Guard Products Inc., d.b.a. Falcon Technologies and Services, Inc.*, v. *Sentinel Manufacturing, Inc. (f/k/a/ Sentinal Containment, Inc.)*, In the United States District Court for the Southern District of Texas, Houston Division, Civil Action No. 4:17-CV-00971, Oct. 31, 2018, 3 pp.
Notice of Attorney Appearance, *Asset Guard Products Inc., d.b.a. Falcon Technologies and Services, Inc.*, v. *Sentinel Manufacturing, Inc. (f/k/a Sentinal Containment)*, In the United States District Court for the Southern District of Texas, Houston Division, Civil Action No. 4:17-CV-00971, Oct. 31, 2018, 2 pp.
Amended Motion for Leave to File Amended Complaint, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Jan. 15, 2019. 5 pp.
Certificate of Conference Regarding Amended Motion for Leave to File Amended Complaint, *Asset Guard Products Inc., d.b.a. Falcon Technologies and Services, Inc.*, v. *Sentinel Manufacturing, Inc. (f/k/a Sentinal Containment, Inc.)* In the United States District Court for the Southern District of Texas, Houston Division, Civil Action No. 4:17-CV-00971, Jan. 16, 2019. 2 pp.
Certificate of Conference Regarding Motion for Leave to File Final Infringement Contentions, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Jan. 16, 2019, 2 pp.
Motion for Leave to File Final Infringement Contentions, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Jan. 16, 2019, 4 pp.
Order, *Asset Guard Products Inc.; dba Falcon Technologies and Services, Inc.*, vs. *Sentinel Containment, Inc.*, In the United States District Court of the Southern District of Texas, Houston Division, Civil Action No. 4:17-CV-00971, Feb. 14, 2019, p. 1.
Order, *Asset Guard Products Inc., dba Falcon Technologies and Services, Inc.*, vs. *Sentinel Containment, Inc.*, United States District Court, Southern District of Texas, Houston Division, Civil Action No. 4:17-CV-00971, Feb. 14, 2019, 1 p.
Amended Scheduling Order, *Asset Guard Products, Inc. d/b/a Falcon Technologies and Services, Inc.*, v. *Sentinel Manufacturing, Inc. f/k/a Sentinal Containment, Inc.*, In the United States District Court for the Southern District of Texas, Houston Division, Civil Action No. 4:17-CV-00971, Mar. 8, 2019, 2 pp.
Joint Memorandum on Conclusion of ADS Proceedings, *Asset Guard Products Inc., d.b.a Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Apr. 16, 2019, 3 pp.
Memorandum on Conclusion of ADR Proceedings, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Apr. 8, 2019, 2 pp.
Defendant Sentinel Manufacturing, Inc.'s Partial Motion for Judgment on the Pleadings, *Asset Guard Products Inc., d.b.a. Falcon Technologies and Services, Inc.*, v. *Sentinel Manufacturing, Inc. (f/k/a Sentinel Containment, Inc.)*, In the United States District Court for the Southern District of Texas, Houston Division, Civil Action No. 4:17-CV-00971, served Apr. 19, 2019, 12 pp.
Plantiff Asset Guard Products Inc.'s d.b.a. Falcon Technologies, Inc., Answer to Defendant's Answer, Counterclaims, & Defenses (Dkt. No. 59), *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, May 10, 2019, 6 pp. 107399201.
Plaintiff Asset Guard Products Inc., dba Falcon Technologies and Services, Inc.'s Response in Opposition to Defendant's Partial Motion for Judgment on the Pleadings, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, May 10, 2019, 13 pp.
Defendant Sentinel Manufacturing, Inc.'s Responsive Claim Construction Brief, *Asset Guard Products Inc., d.b.a. Falcon Technologies and Services, Inc.*, v. *Sentinel Containment, Inc.*, United States District Court for the Southern District of Texas, Houston Division, Civil Action No. 4:17-CV-00971, Mar. 21, 2018, 31 pp.
Notice of Resetting, *Asset Guard Products Inc.* v. *Sentinel Containment, Inc.*, United States District Court for the Southern District of Texas, Houston Division, Civil Action No. 4:17-CV-00971, Aug. 7, 2018, 1 p.
Order Granting Defendant Sentinel Manufacturing, Inc.'s Unopposed Motion for Leave to File Supplemental Claim Construction Brief, *Asset Guard Products Inc., d.b.a. Falcon Technologies and Services, Inc.*, v. *Sentinel Manufacturing, Inc. (f/k/a Sentinel Containment, Inc.)*, United States District Court for the Southern District of Texas, Houston Division, Civil Action No. 4:17-CV-00971, Oct. 1, 2018, 1 p.
Claim Construction Chart—U.S. Pat. No. 9,410,302, *Asset Guard Products Inc.* v. *Sentinel Manufacturing Inc.*, Civil Action No. 4:17-CV-00971, Judge Andrew S. Hanen, Oct. 31, 2018, 15 pp.
Memorandum and Order on Claim Construction, *Asset Guard Products Inc. dba Falcon Technologies and Services, Inc.*, vs. *Sentinel Containment, Inc.*, In the United States District Court for the Southern District of Texas, Houston Division, Civil Action No. 4:17-CV-00971, Nov. 29, 2018, 11 pp.
Amended Complaint for Patent Infringement, Exhibit 1, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Jan. 15, 2019, 8 pp.
Plaintiff Asset Guard Products Inc.'s Final Infringement Contentions, Exhibit A, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Jan. 16, 2019, 44 pp.
Amended Complaint for Patent Infringement, *Asset Guard Products Inc., d.b.a. Falcon Technologies and Services, Inc.*, v. *Sentinel Manufacturing, Inc. (f/k/a Sentinal Containment, Inc.)*, In the United States District Court for the Southern District of Texas, Houston Division, Civil Action No. 4:17-CV-00971, Jan. 15, 2019, 8 pp.
Defendant Sentinel Manufacturing Inc.'s Answer, Counterclaims, & Defenses to Amended Complaint (Dkt. No. 52), *Asset Guard Products Inc., d.b.a. Falcon Technologies and Services, Inc.*, v. *Sentinel Manufacturing, Inc. (f/k/a Sentinal Containment, Inc.)*, United States District Court for the Southern District of Texas, Houston Division, Civil Action No. 4:17-CV-00971, Apr. 19, 2019, 14 pp.

(56) References Cited

OTHER PUBLICATIONS

Plaintiff Asset Guard Products Inc.'s d.b.a. Falcon Technologies, Inc., Objections and Responses to Defendant's First Requests for Admission, Exhibit 1, *Asset Guard Products Inc., d.b.a. Falcon Technologies and Services, Inc.*, v. *Sentinel Manufacturing, Inc. (f/k/a Sentinal Containment, Inc.*), In the United States District Court for the Southern District of Texas, Houston Division, Civil Action No. 4:17-CV-00971, Nov. 6, 2018, 7 pp.

* cited by examiner

EQUIPMENT PLATFORM

TECHNICAL FIELD

The present disclosure relates to a structural element that provides load bearing support. In particular, the present disclosure provides an encapsulated material that can serve as a load bearing support for various types and sizes of industrial equipment.

BACKGROUND

There are several types of equipment used on or near well sites, compressor stations, refineries, and chemical plants such as compressors, treater units, cooling units, heaters, pumps, and the like.

Oftentimes, supports or foundations for such equipment involve the use of gravel or dirt pads built specifically for each type of equipment. Inclement weather can wash out these gravel and dirt pads, causing the equipment to become unstable. Moreover, building pads specifically for each type of equipment consumes time for pre-planning and constructing a pad suitable for each type of equipment. It can take several days to plan and construct these pads.

A need exists for an improved equipment base that can withstand inclement weather conditions. There is also a need for an equipment base that provides for a more time-effective and cost-effective means of the shipping, transporting, and installation into customer sites.

BRIEF DESCRIPTION OF THE DRAWINGS

The accompanying drawings facilitate an understanding of the various exemplary embodiments.

DETAILED DESCRIPTION

Figure 1:
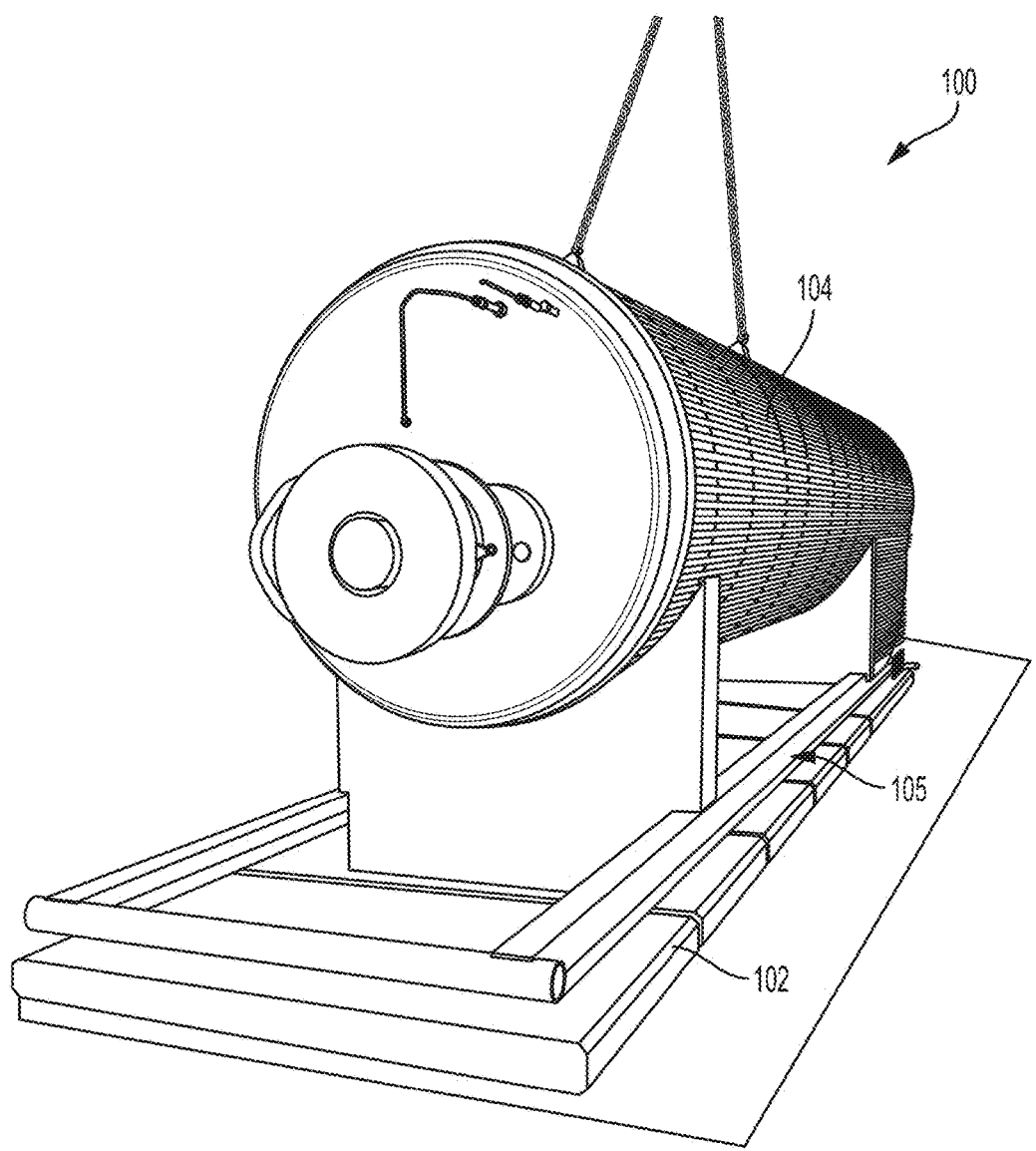
FIG. 1 is a perspective view of a system having an equipment base supporting an equipment unit, according to an exemplary embodiment.

In an exemplary embodiment, as illustrated in FIG. 1, a system is generally referred to by the reference numeral 100 and includes an equipment base 102 that extends over the ground surface. An equipment unit 104 having a bottom or lowermost portion 105 is shown positioned on top of the equipment base 102 so that the equipment base 102 supports the equipment unit 104, preventing the lowermost portion 105 of the equipment unit 104 from contacting the ground surface. The equipment unit 104 can be or include any one or more devices, systems, apparatuses, including for example, an HVAC unit, a heat exchanger, a compressor, a pump, a mixing vessel, a reactor vessel, a storage tank, a surge drum, an engine, and the like and any combination thereof.

Figure 2:
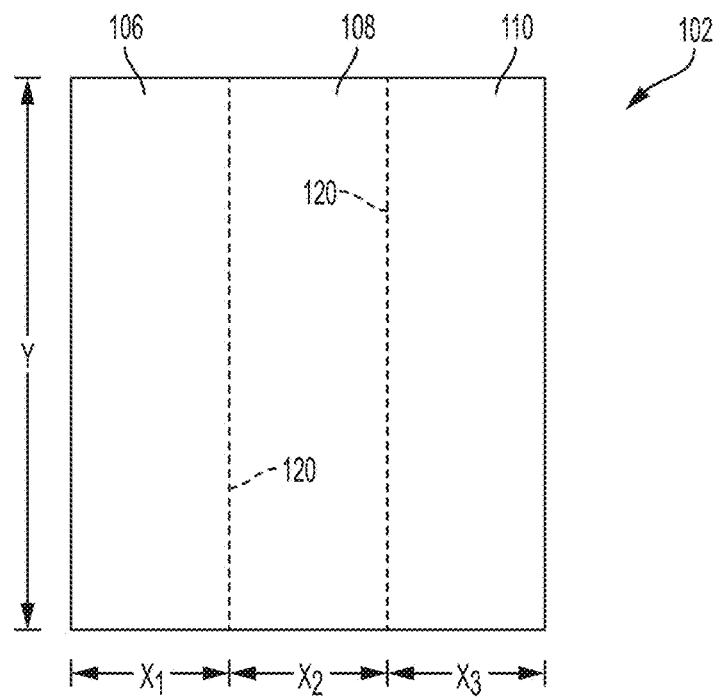
FIG. 2 is a top view of the equipment base of FIG. 1.

FIG. 2 is a top view of the equipment base 102 of FIG. 1. The equipment base 102 can be a single piece, or segment, or can include two or more segments. As shown in FIG. 2, the equipment base 102 contains a first segment 106, a second segment 108, and a third segment 110. The segments 106, 108, 110 can have any suitable dimensions. As shown in FIG. 2, the segments 106, 108, 110 can each have a length y and a width ($x_1$, $x_2$, or $x_3$). The length y and width $x_1$, $x_2$, or $x_3$ can vary to any suitable measurements depending on the equipment unit or units to be supported. In one or more exemplary embodiments, $x_1$, $x_2$, and $x_3$ can be independently from about 10 cm to about 5 m, such as from about 25 cm to about 3 m, such as from about 50 cm to about 2 m, such as about 1 m and y can be from about 10 cm to about 10 m, such as from about 25 cm to about 5 m, such as from about 50 cm to about 3 m, such as from about 1 m to about 2 m.

The segments 106, 108, 110 can be or include any suitable substrate. As used herein, the term "suitable substrate" is used synonymously with "substrate" and is meant to include without limitation, concrete, metal, polymeric solids, polymeric foams, such as expanded polystyrene (EPS) and expanded polyurethane, wood, paper fiber, fiberglass, fiber board, and gravel or any other substrate appropriate for the adhesion of an elastomeric coating, such as a polyurea elastomer coating. In one or more embodiments, a substrate includes one or more foam materials such as EPS, polyisocyanurate foams, polyurethane foam, polyvinyl chloride foam, polyimide foam, silicone foam, or microcellular foam or any suitable combinations thereof. The foam material can have any suitable density. For example, the foam material can have a density of about 0.5 pounds per square foot ($lb/ft^3$) to about about 8 $lb/ft^3$ or more, such as from about 1 $lb/ft^3$ to about 5 $lb/ft^3$, such as from about 1.5 $lb/ft^3$ to about 3 $lb/ft^3$, such as from about 2 $lb/ft^3$ to about 2.5 $lb/ft^3$. In one or more exemplary embodiments, the foam material has a density from about 1.5 $lb/ft^3$ to about 2.5 $lb/ft^3$. The foam material can be substantially non-degradable or substantially degradable. In one or more exemplary embodiments, the foam material is biodegradable.

The substrate can have any suitable thickness sized to support any suitable equipment. In one or more exemplary embodiments, the substrate can have a thickness of from about 0.5 inch to about 12 inches or more, such as from about 1 inch to about 8 inches, such as from about 2 inches to about 6 inches, such as from about 3 inches to about 5 inches, for example about 4 inches. For example, a piece of equipment weighing approximately 50,000 pounds can be supported by EPS having a foam density of 2 pounds per cubic foot of foam weight, ranging from about 3 to about 12 inches in thickness.

The segments 106, 108, 110 can also include an elastomeric outer coating or layer. In one or more exemplary embodiments, the segments 106, 108, 110 are each encapsulated with the elastomeric layer. The elastomeric layer can be or include any polymeric material that can both create a fluid impermeable barrier layer and adhere directly to and/or at least partially penetrate the foam material of the segments 106, 108, 110. In one or more embodiments, the polymeric material can be or include polyurea. The elastomeric coating can have any suitable thickness. In one or more exemplary embodiments, the elastomeric coating of the liner 104 can have a thickness about 5 mil, about 10 mil, about 15 mil, 20 mil, about 30 mil, about 40 mil to about 50 mil or more.

The segments 106, 108, 110 can also have any suitable thickness sized to support any suitable equipment. In one or more exemplary embodiments, the segments 106, 108, 110 can have a thickness of from about 0.5 inch to about 12 inches, such as from about 1 inch to about 8 inches, such as from about 2 inches to about 6 inches, such as from about 3 inches to about 5 inches, for example 4 inches. For example, a piece of equipment weighing approximately 50,000 pounds can be supported by segments 106, 108, 110 having a thickness from about 3 inches to about 12 inches.

The segments 106, 108, 110 can form one or more seams 120 (two are shown) when positioned adjacent one another to form the equipment base 102. These seams can allow for moisture to pass between the segments and away from the equipment 104 and its lowermost portion 105, thereby preventing corrosion of the lowermost portion 105.

Figure 3:
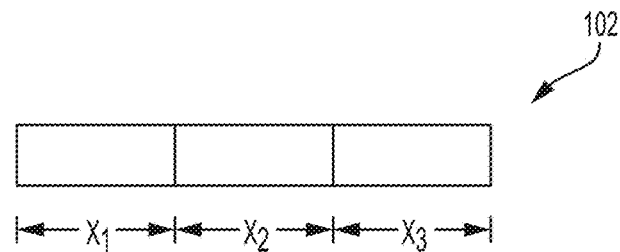
FIG. 3 is a side view of the equipment base of FIG. 1.
Figure 4:
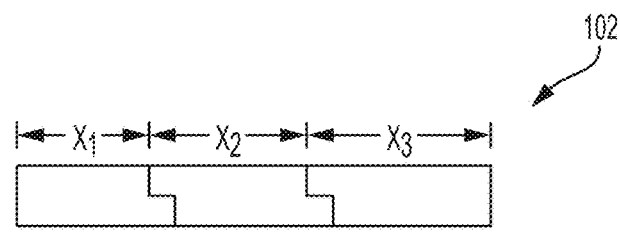
FIG. 4 is side view of another equipment base, according to an exemplary embodiment.

FIGS. 3 and 4 illustrate side views of the equipment bases and a couple of corresponding seams possible with the present disclosure. Straight seams depicted in FIG. 3 allow for any moisture from rainwater, for example, to pass through so as to prevent corrosion of the equipment from standing water effects. Interlocking seams seen in FIG. 4 also allow for moisture to seep away from the bottom of the equipment but also allow for another embodiment in which to piece or hold together the substrates. In one or more exemplary embodiments (not shown), the segments 106, 108, 110 can contain protrusions and corresponding recesses to form interlocking seams connecting adjacent segments together. In one or more exemplary embodiments (not shown), a strap with a cam buckle can be used to secure the segments 106, 108, 110 around the outer periphery of the edges and hold the pieces together until the pressure from the weight of the equipment is applied.

An exemplary method for constructing the equipment base 100 can include spraying an elastomeric coating onto the substrates to form the segments 106, 108, 110. The segments 106, 108, 110 can then be positioned adjacent to one another to form the equipment base 100.

Figure 5:
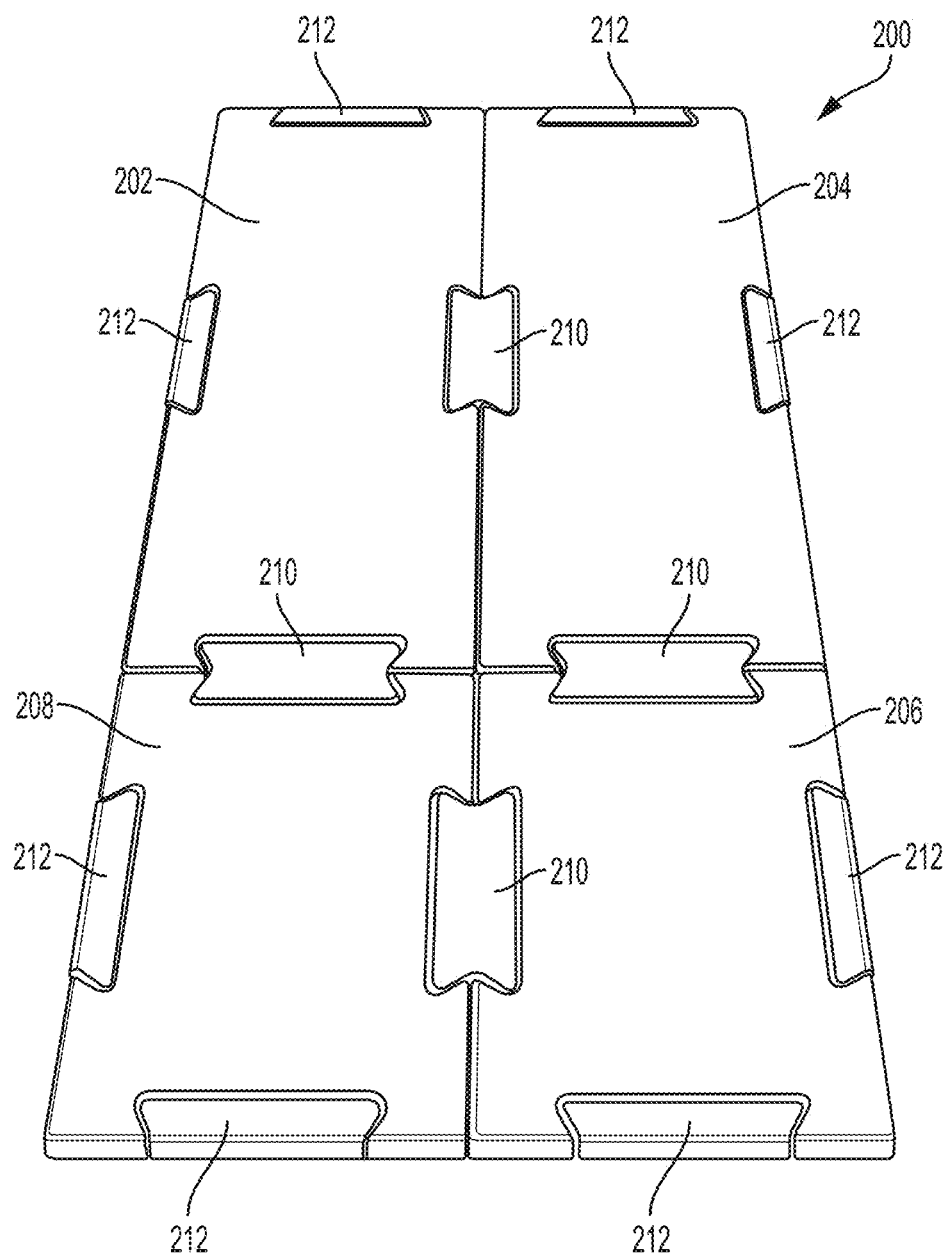
FIG. 5 is a perspective view of another equipment base, according to an exemplary embodiment.
Figure 6:
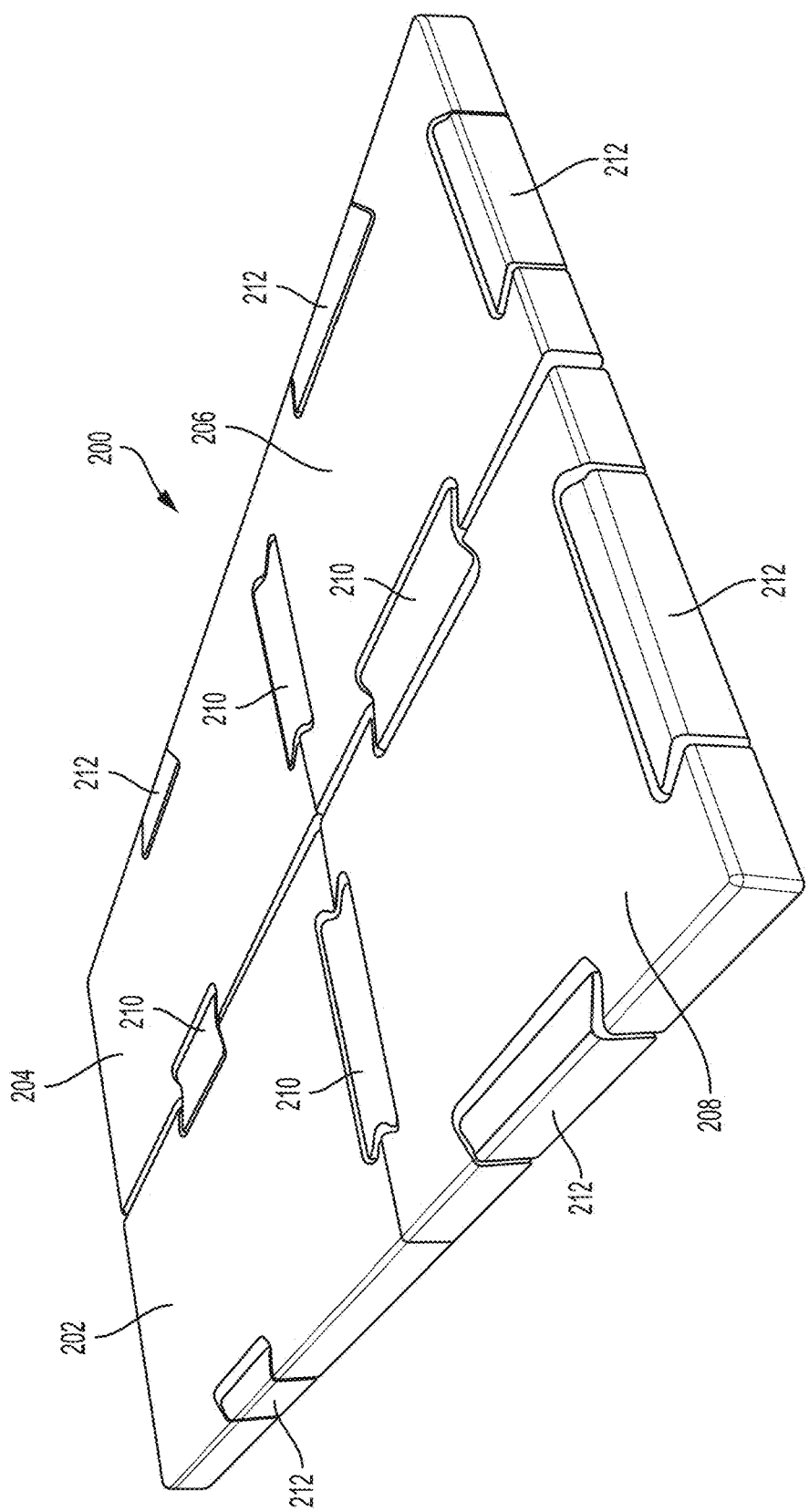
FIG. 6 is a perspective view of the equipment base of FIG. 5.

FIG. 5 is a perspective view of another equipment base 200. The equipment base 500 can include any number of segments. Four segments are shown in FIG. 5 (202, 204, 206, 208) though it is contemplated herein that the equipment base 200 can include 2, 6, 8, or 10 or more segments. Adjacent segments, for example, 202 and 204, can be adjoined to each other by a key member 210. Key member(s) 210 can have the same composition and thickness as the segments 202, 204, 206, 208. In one or more exemplary embodiments, any adjacent segments can also be adjoined to one another by any suitable means, for example, with adhesives, fasteners, nails, screws, bolts, and sealants and the like. The equipment base 200 can include one or more side members 212 for filling any gaps (see FIGS. 7 and 8) in the exposed sides of the equipment base 200. Like key member 210, the side member 212 can have the same composition and thickness as the segments 202, 204, 206, 208. FIG. 6 is a perspective view of the equipment base of FIG. 5.

Figure 7:
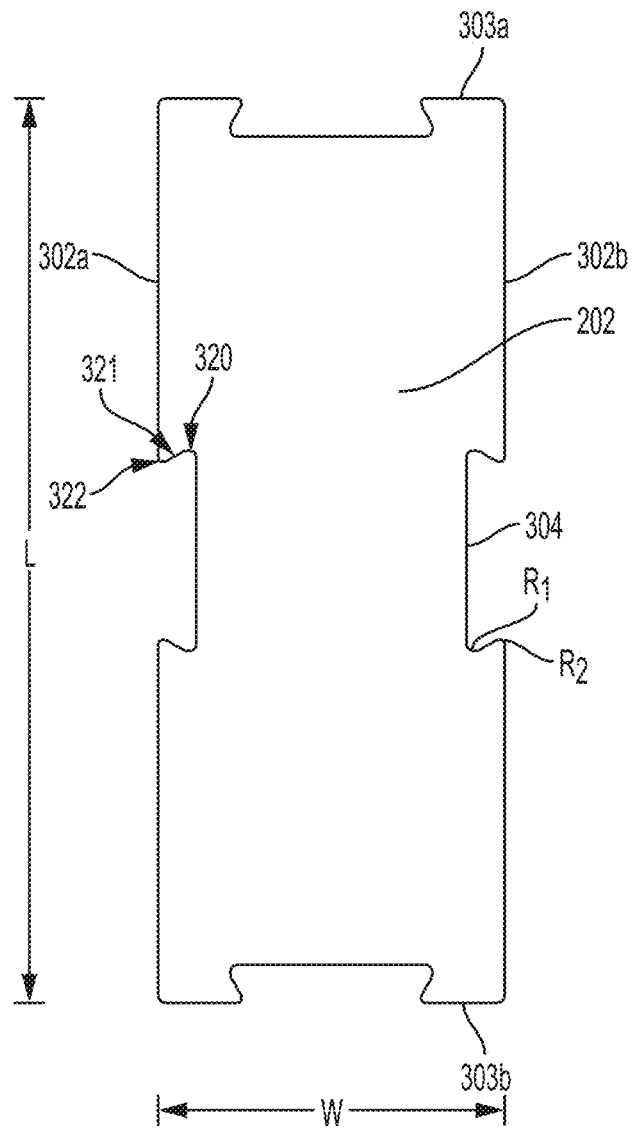
FIG. 7 is a top view of a segment of the equipment base of FIG. 5.

The segments 202, 204, 206, 208, the key member 210 and the side member 212, can have the same dimensions, compositions and thicknesses as discussed above for segments 106, 108, 110. FIG. 7 is a top view of segment 202 of equipment base 200. Segment 202 can include two sides 302a, 302b and two ends 303a, 303b. Segment 202 can include a length L measured along a side 302a, 302b from about 10 cm to about 10 m, such as from about 25 cm to about 5 m, such as from about 50 cm to about 3 m, such as from about 1 m to about 2 m and a width W measured along an end 303a, 303b from about 10 cm to about 5 m, such as from about 25 cm to about 3 m, such as from about 50 cm to about 2 m, for example about 1 m. Segment 202 can include one or more recesses 304 (four are shown). The recesses 304 can include an inner arcuate portion 320 and an outer arcuate portion 322. A linear segment 321 can be disposed between the inner arcuate portion and the outer arcuate portion. The inner arcuate portion 320 can have an inner radius of curvature R1 and the outer arcuate portion 322 can have an outer radius of curvature R2. The inner radius of curvature R1 can be from about 0.75 inch to about 1.5 inch, such as from about 1 inch to about 1.35 inch, such as from about 1.25 inch to about 1.3 inch. The outer radius of curvature R2 can be from about 0.25 inch to about 1 inch, such as from about 0.5 inch to about 0.9 inch, such as from about 0.7 inch to about 0.8 inch.

Figure 8:
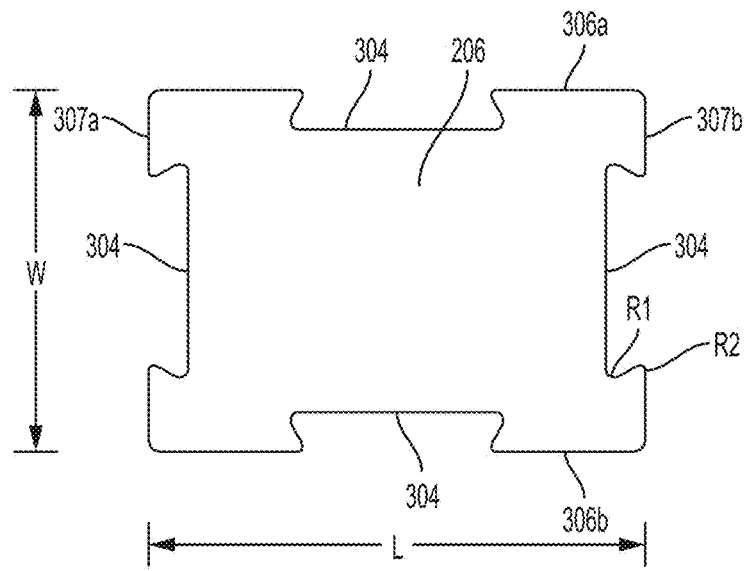
FIG. 8 is a top view of another segment of the equipment base of FIG. 5.

FIG. 8 is a top view of segment 206 of equipment base 200. As shown, segment 206 can have a different size and shape than segment 202, though it is contemplated herein that segment 206 can be the same size and shape as segment 202. Segment 206 can include two sides 307a, 307b and two ends 306a, 306b. Segment 206 can include a length L measured along a side 307a, 307b from about 10 cm to about 10 m, such as from about 25 cm to about 5 m, such as from about 50 cm to about 3 m, such as from about 1 m to about 2 m and a width W measured along an end 303a, 303b from about 10 cm to about 5 m, such as from about 25 cm to about 3 m, such as from about 50 cm to about 2 m, for example about 1 m. Segment 206 can also include the one or more recesses 304 discussed above (four are shown).

Figure 9:
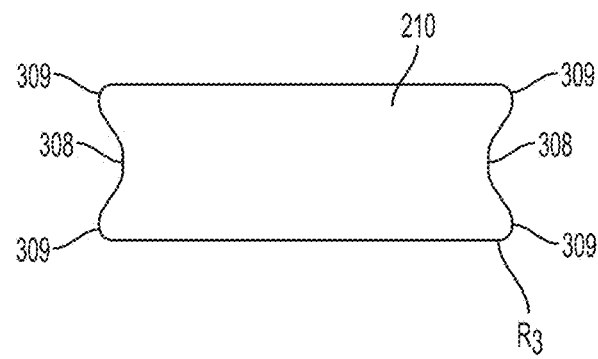
FIG. 9 is a top view of a key member of the equipment base of FIG. 5.

FIG. 9 is a top view of key member 210 of equipment base 200. The key member 210 can have one or more protruding portions 309 (four are shown) and one or more recessed portions 308 (two are shown). The protruding portion 309 can have an arcuate shape adapted to fit within the inner arcuate portion 320. The protruding portion 309 can have a radius of curvature R3 of from about 0.25 inch to about 1 inch, such as from about 0.5 inch to about 0.9 inch, such as from about 0.7 inch to about 0.8 inch.

Figure 10:
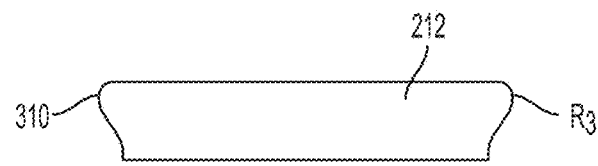
FIG. 10 is a top view of a side member of the equipment base of FIG. 5.

FIG. 10 is a top view of side member 212 equipment base 200. The side member 212 can have one or more protruding portions 310 (two are shown). The protruding portion 310 can have an arcuate shape adapted to fit within the inner arcuate portion 320. The protruding portion 310 can have a radius of curvature R3 of from about 0.25 inch to about 1 inch, such as from about 0.5 inch to about 0.9 inch, such as from about 0.7 inch to about 0.8 inch.

An exemplary method for constructing the equipment base 200 can include spraying an elastomeric coating onto the substrates, or cores, of segments (such as segments 106, 108, 110, 202, 204, 206, 208), key members (such as key members 210) and side members (such as side members 212) so that the segments, the key members and/or the side members are each independently coated or encapsulated with the elastomeric coating. The coated segments (such as segments 106, 108, 110, 202, 204, 206, 208) can be connected to each other via key members 210 as shown in FIGS. 5 and 6. To complete the equipment base 200, side members 212 can be placed into any exposed recess in the outward facing side walls of the segments 202, 204, 206, 208 as shown in FIGS. 5 and 6.

The coated segments (such as segments 202, 204, 206, 208), the key members 210 and the side members 212 can form one or more seams when positioned adjacent one another to form the equipment base 200. These seams can allow for moisture to pass between the segments and away from any equipment 104 supported by the equipment base 200. In one or more exemplary embodiments, the seams can be at least partially filled with adhesives, caulking material, the elastomeric coating or any other type of suitable filler material.

Though particular shapes of equipment bases, its segments and other component parts are disclosed herein, the equipment base can include any suitable configuration, size, and shape. For example, the equipment base can have a triangular, square, rectangular, circular, oval, hexagonal, or octagonal footprint and can be from about 1 foot to about 50 feet or more in its largest dimension, such as from about 2 feet to about 20 feet, such as from about 3 feet to about 12 feet, such as from about 4 feet to about 8 feet, for example about 6 feet. In several exemplary embodiments, the equipment base has a square or rectangular footprint, and ranges from about 1 foot to about 20 feet in length, and from about 1 foot to about 20 feet in width.

The equipment bases disclosed herein can provide improved support for several types of equipment. The equipment can be or include any one or more devices, systems, apparatuses, including for example, an HVAC unit, a heat exchanger, a compressor, a pump, a mixing vessel, a reactor vessel, a storage tank, a surge drum, an engine, and the like and any combination thereof.

During operation, the equipment can produce vibrational forces that can affect the support of the equipment. An equipment base of the present disclosure can distribute vibrational forces produced by the equipment to enable vibration dampening. In one or more exemplary embodiments, an equipment base of the present disclosure can be configured to dampen movement of the equipment relative to at least one dimension. In one or more exemplary embodiments, an equipment base of the present disclosure can be configured to dampen the vibration of the equipment relative to the ground.

The equipment base can have any suitable properties that enable vibration dampening when supporting the equipment. Shear modulus (G) represents a material's response to shear stress and, for the equipment base, can be from about 2 MPa to about 10 MPa, such as from about 4 MPa to about 8 MPa, such as from about 4.5 MPa to about 6 MPa, such as from about 5 MPa to about 5.5 MPa, for example about 5.5 MPa. In one or more exemplary embodiments, the shear modulus of the equipment base can be about 5 MPa to about 5.3 MPa. A damping ratio (D) can be used to measure decay of oscillations in material after a disturbance and, for the equipment base, can be from about 0.1% to about 5%, such as from about 0.25% to about 2.5%, such as from about 0.5% to about 2%, such as from about 0.75% to about 1.8%, such as from about 0.9% to about 1.5%, such as from about 1% to about 1.3%. In one or more exemplary embodiments, the damping ratio of the equipment base can be about 1.2% to about 1.8%.

During operation, certain equipment, such as heat exchangers, pipe systems, turbines, compressors, and HVAC systems can undergo extreme temperature changes that can result in thermal expansion or contraction, which can affect the support of the equipment. The seams inherent in equipment bases of the present disclosure can act as expansion joints, allowing the circumference or footprint of the equipment base to expand and/or contract depending on the temperature change occurring in the equipment, thereby preventing damage to the equipment or the equipment base. In one or more exemplary embodiments, a footprint of the equipment base can expand and contract due to any expansion or contraction of the equipment.

Referring again to FIG. 5, in one or more exemplary embodiments, a piece of equipment (not shown) having four base legs can be positioned on top of the equipment base 200 so that the first base leg is on top of and affixed or otherwise connected to segment 202 via one or more screws, bolts, welds, or other fastening devices. In a manner similar to that of the first leg, the second leg can be affixed to segment 204, the third leg can be affixed to segment 208, and the fourth leg can be affixed to segment 206. During its operation, the equipment can expand via thermal expansion causing the first, second, third, and fourth legs move apart from each other, causing the footprint of the equipment base to expand.

In one or more exemplary embodiments, the equipment base can be located on any side of, on top of, and/or below the equipment when it is desired to insulate the equipment from heat exchange either from the bottom upwards or from the equipment downwards, or from side to side such as use with freezers or industrial piping. The equipment base can provide an effective, long lasting thermal insulation barrier. The equipment base can have an R-Value, measured in accordance with ASTM C518, of from about 2° $F.ft^2h/Btu$ to about 10° $F.ft^2h/Btu$, such as from about 2.5° $F.ft^2h/Btu$ to about 8° $F.ft^2h/Btu$, such as from about 3° $F.ft^2h/Btu$ to about 6° $F.ft^2h/Btu$, such as from about 3.5° $F.ft^2h/Btu$ to about 5° $F.ft^2h/Btu$, for example about 4.5° $F.ft^2h/Btu$.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upward," "downward," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures. In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclo-

What is claimed is:

1. An equipment base sized to provide a load-bearing support for equipment and configured to allow moisture passage, the equipment base comprising:
   a first coated substrate, comprising:
      a first part having a first thickness sized to provide the load-bearing support for the equipment;
      a first elastomer covers the first part; and
      a first planar portion;
   a second coated substrate configured to be positioned adjacent to the first coated substrate, the second coated substrate comprising:
      a second part having a second thickness sized to provide the load-bearing support for the equipment;
      a second elastomer covers the second part; and
      a second planar portion;
      wherein the first and second planar portions are coplanar when the second substrate is positioned adjacent to the first coated substrate and perpendicular to each of the respective first and second thicknesses of the first and second parts; and
   a first seam formed between the first and second coated substrates to allow for moisture to pass between the first and second coated substrates.

2. The equipment base of claim 1, wherein the first and second coated substrates are encapsulated by the first and second elastomer, respectively, to provide first and second encapsulated substrates.

3. The equipment base of claim 2, wherein the first and second coated substrates each have an R-Value, measured in accordance with ASTM C518, of 2° $F.ft^2h/Btu$ to 10° $F.ft^2h/Btu$.

4. The equipment base of claim 2, wherein the first and second encapsulated substrates are shaped so that the first seam is interlocking.

5. The equipment base of claim 2, wherein the equipment base further comprises a strap extending around an outer periphery of the equipment base to hold the first and second encapsulated substrates together.

6. The equipment base of claim 1, wherein the first and second substrates comprise first and second edges, respectively; and wherein the second edge interfits with the first edge to at least partially form the first seam.

7. The equipment base of claim 1, wherein the first part and the second part comprise a foam material.

8. The equipment base of claim 7, wherein the foam material has a density of at least 1.0 pounds per cubic foot.

9. The equipment base of claim 7, wherein the foam material comprises expanded polystyrene.

10. The equipment base of claim 1, wherein the first elastomer and the second elastomer comprise polyurea.

11. The equipment base of claim 1, wherein the first elastomer and the second elastomer each have a thickness of at least 50 mils.

12. The equipment base of claim 1, wherein the first thickness and the second thickness are each at least 2 inches.

13. The equipment base of claim 1, wherein the equipment base is configured to distribute vibrational forces produced by the equipment to enable vibration dampening.

14. The equipment base of claim 1, wherein a footprint of the equipment base expands or contracts due to any expansion or contraction, respectively, of the equipment.

15. An equipment base sized to provide a load-bearing support for equipment and configured to allow moisture passage, the equipment base comprising:
   a first encapsulated substrate, comprising:
      a first part having a first thickness sized to provide the load-bearing support for the equipment;
      a first elastomer encapsulate the first part;
      a first planar portion; and
      a first recess;
   a second encapsulated substrate configured to be positioned adjacent to the first encapsulated substrate, the second encapsulated substrate comprising:
      a second part having a second thickness sized to provide the load-bearing support for the equipment;
      a second elastomer encapsulate the second part;
      a second planar portion; and
      a second recess;
      wherein the first and second planar portions are coplanar when the second encapsulated substrate is positioned adjacent to the first encapsulated substrate and perpendicular to each of the respective first and second thicknesses of the first and second parts;
   a first seam formed between the first and second encapsulated substrates; and
   a key member configured to fit within the first and second recesses to adjoin the first encapsulated substrate to the second encapsulated substrate.

16. The equipment base of claim 15, wherein the key member comprises a third part having a third thickness sized to provide the load-bearing support for the equipment and a third elastomer encapsulate the third part.

17. The equipment base of claim 15, wherein the first part, second part and third part comprise a foam material.

18. The equipment base of claim 15, wherein the first elastomer, the second elastomer, and the third elastomer comprise polyurea.

19. A method of installing an equipment base sized to provide a load-bearing support for equipment and configured to allow moisture passage, the method comprising:
   positioning a first encapsulated substrate, the first encapsulated substrate comprising:
      a first part having a first thickness sized to provide the load-bearing support for the equipment;
      a first elastomer encapsulating the first part;
      a first planar portion; and
      a first recess;
   positioning a second encapsulated substrate adjacent the first encapsulated substrate, the second encapsulated substrate comprising:
      a second part having a second thickness sized to provide the load-bearing support for the equipment;
      a second elastomer encapsulating the second part;
      a second planar portion; and
      a second recess;
      wherein the first and second planar portions are coplanar and perpendicular to each of the respective first and second thicknesses of the first and second parts after positioning the second encapsulated substrate;
   forming a first seam between the first and second encapsulated substrates to allow for moisture to pass between the first and second encapsulated substrates so that moisture is allowed to seep away from the bottom of the equipment, via the first seam, when the equipment base provides the load-bearing support for the equipment; and positioning a key member within the first and second recesses to adjoin the first encapsulated substrate to the second encapsulated substrate.

\* \* \* \* \*